United States Patent Office 3,305,527
Patented Feb. 21, 1967

3,305,527
EPOXIDE RESIN COMPOSITIONS
Herbert P. Price, Louisville, Ky., assignor to Celanese Coatings Company, Inc., a corporation of Delaware
No Drawing. Filed Dec. 9, 1964, Ser. No. 417,224
11 Claims. (Cl. 260—47)

This invention relates to novel polyepoxide resin compositions and more particularly to epoxide resin compositions having improved viscosity characteristics.

Polyepoxide resins are versatile compounds having a combination of chemical and physical properties that make them valuable in a number of industrial applications. For example, they have been used in high-strength adhesives, in durable flooring compositions and in a variety of laminated products. They are particularly valuable for use as potting and casting materials since they combine excellent electrical and mechanical properties with low shrinkage during the curing reaction.

Most epoxide resins are either solids or viscous liquids at room temperature and, therefore, they cannot be readily blended with the other ingredients of the resinous compositions. In addition, the viscous compositions have poor flow, penetration and wetting properties. The fluidity of the epoxide resins has been improved by heating them and thereby reducing their viscosity or by diluting them with a suitable solvent. Among the solvents that have been used for this purpose are volatile solvents which evaporate from the compositions during the curing reaction, such as acetone, methyl ethyl ketone, methyl isobutyl ketone, ethyl acetate, chloroform, benzene, xylene and the like, and non-volatile solvents which remain in the cured compositions, such non-volatile solvents being dibutyl phthalate, dioctyl phthalate, etc. In addition, reactive diluents such as butyl glycidyl ether, phenyl glycidyl ether, styrene oxide, propylene oxide, and 1,4-butanediol diglycidyl ether, have been used. These procedures for the reduction of the viscosity of polyepoxide resin compositions have often proven to be unsatisfactory since they may be difficult and expensive to carry out and since they may form products having relatively poor adhesion and undesirable dermatitic activity.

It has now been found that 1,2 alkylene carbonates can be combined with epoxide resins to form products that are substantially lower in viscosity and far superior in handling properties than the unmodified resins. The 1,2 alkylene carbonate modified epoxide resin composition exhibit excellent penetration, flow and wetting properties and are able to tolerate sizable amounts of fillers.

Compositions have been prepared comprised of a polyepoxide resin having a 1,2 epoxy equivalency greater than 1 and from 1 to 80 parts by weight per 100 parts by weight of said polyepoxide of an alkylene 1,2 carbonate having 2 to 10 carbon atoms in its alkylene group.

Furthermore, a process for preparing cured compositions is proposed which comprises mixing a polyepoxide resin having a 1,2 epoxy equivalency greater than 1, from 1 to 80 parts by weight per 100 parts by weight of said polyepoxide resin of an alkylene 1,2 carbonate having 2 to 10 carbon atoms in its alkylene group and an epoxide resin curing agent and curing the resulting mixture.

The 1,2 alkylene carbonates have high boiling points and low vapor pressures. These properties contribute to minimum weight losses during the curing of the modified epoxide resin compositions, and to low shrinkage of the cured materials.

The 1,2 alkylene carbonates are essentially non-toxic either for large single oral doses or by skin absorption and thus contribute little or no undesirable dermatitic activity to the modified epoxide resin systems.

The 1,2 alkylene carbonates are considered to be reactive diluents for epoxide resins because they react during the cure and become an integral part of the cured composition. The cyclic carbonate group when reacted with an amine is cleaved and adds to the amine forming a carbamate. This reaction is related to the reaction of an epoxide group with an amine wherein the epoxide ring is cleaved forming an N-substituted amine.

A wide variety of epoxide resins can be used in the practice of the present invention. The useful epoxide resins are those having more than one 1,2 epoxide group per molecule. They can be saturated or unsaturated, aliphatic, cycloaliphatic, aromatic, or heterocyclic. They can be monomeric or polymeric in nature.

The polyepoxide resins include epoxidized hydrocarbons, such as vinyl cyclohexene dioxide, butadiene dioxide, dicyclopentadiene dioxide, epoxidized polybutadiene and limonene dioxide. Other epoxide compounds are epoxidized esters, for example, epoxidized soybean oil, epoxidized glycerol trilinoleate and 3,4-epoxy-6-methylcyclohexylmethyl - 3,4 - epoxy-6-methylcyclohexanecarboxylate. Still other epoxides are polymers and copolymers of vinyl polymerizable monoepoxides, such monoepoxides being allyl glycidyl ether, glycidyl acrylate and glycidyl methacrylate.

Additional polyepoxides for use in the compositions of this invention include glycidyl ethers of polyhydric phenols obtained by reacting a polyhydric phenol in an excess of epichlorohydrin with sodium hydroxide. Such polyhydric phenols include bisphenol A (p,p'dihydroxydiphenyl propane), resorcinol, hydroquinone, 4,4'dihydroxybenzophenone, bis(4-hydroxyphenyl) ethane, 1,5-dihydroxyphthalene, 4,4'dihydroxy biphenyl, novolak resins containing more than 2 phenol moieties linked through methylene bridges, and the like.

Other glycidyl polyethers are polymers prepared by reacting 1.2 up to about 2 mols of epichlorohydrin with 1 mol of a dihydric phenol or by reacting diepoxides with added dihydric phenol.

The compositions of this invention also include polyglycidyl ethers of polyhydric alcohols, made by reacting a polyhydric alcohol and epichlorohydrin with an acidic catalyst such as boron trifluoride, and subsequently treating the resulting product with an alkaline material. Included among the polyhydric alcohols that can be used in the preparation of these polyepoxides are glycerine, ethylene glycol, propylene glycol, diethylene glycol, hexanetriol, pentaerythritol, trimethylol ethane, trimethylol propane, etc. In addition, polyhydric ether alcohols, for instance, diglycerol, dipentaerythritol, polyalkylene glycols and hydroxyalkyl ethers of the aforementioned polyhydric phenols, can be used.

Also included in the compositions of this invention are glycidyl esters of polycarboxylic acids, such acids being azelaic acid, tetraphthalic acid, dimerized and trimerized unsaturated fatty acids, etc.

Other suitable epoxide resins are disclosed in the book "Epoxy Resins" by Lee and Neville, McGraw-Hill Book Company, 1957.

The properties of the polyepoxides of the types described vary within wide limits ranging from those which are liquid at room temperature and which have relatively low molecular weights to those which melt at temperatures above 150° C. and which have relatively high molecular weights. In the preparation of the novel compositions the preferred resins are those which melt below about 140° C. The resins particularly preferred are those which are liquid at room temperature or are low melting solids. Such resins have molecular weights in the range of about 220 to about 1000 and preferably in the range of 340 to 700. However, resins having higher melting points and higher molecular weights can be combined with the alkylene carbonates to form compositions having improved physical properties.

The alkylene carbonates which are used to modify polyepoxide resins are cyclic carbonates which contain one 1,2 carbonate group. These compounds can also be described as the cyclic carbonate diesters of 1,2 glycols. Any 1,2 alkylene carbonate can be used to prepare the compositions of this invention. However, the preferred carbonates are those having 2 to about 10 carbon atoms in the alkylene chain. Such alkylene carbonates are ethylene carbonate, 1,2-propylene carbonate, 1,2-butylene carbonate, 2,3-butylene carbonate, 3,4-hexylene carbonate, 1,2-heptylene carbonate, 3,4-decylene carbonate, and the like. The alkylene group can be straight chained, branched or heterocyclic, and can contain groups and substituents which are not reactive with the epoxide resins, such groups being hydroxyl, ester, ether, etc. The preferred alkylene carbonates are ethylene and propylene carbonates.

The amount of alkylene carbonate used in the novel compositions is that amount which will reduce the viscosity of the resin to the desired level without unduly affecting its other physical and chemical properties. The amount in each case will depend upon such factors as the nature of the polyepoxide resin, its molecular weight and the properties desired in the cured resin. Generally, at least about one part by weight of alkylene carbonate must be present for each 100 parts by weight of the polyepoxide resin in order to obtain a composition having satisfactory fluidity. When a relatively soft, flexible product is desired, 50 to 80 parts by weight or more of the carbonate per 100 parts of the resin can be used. For most applications, about 10 to about 50 parts by weight and preferably 10 to 30 parts by weight of alkylene carbonate are used per 100 parts by weight of resin.

The alkylene carbonate modified polyepoxide resin compositions are converted to the subtantially thermoset stage through the use of any of the known curing agents. These curing agents include, for example, primary, secondary and tertiary amines, quaternary ammonium compounds, Friedel-Crafts catalysts, and organic polycarboxylic acids and their anhydrides. Illustrative of the amine curing agents are ethylene diamine, diethylene triamine, diethylamino propylamine, triethylene tetramine, tetraethylene pentamine, m-phenylene diamine, piperdine, methane diamine, benzyl dimethyl amine, diaminodiphenyl sulphone, dicyandiamide, and iminobispropylamine. Also useful are the polyamido-amines which are the reaction products of an excess of polyamines with monomeric or polymeric fatty acids. The amine curing agents are used in the amounts of about 0.5 to 1.5 equivalents of amine hydrogen per epoxide group and carbonate group in the epoxide resin composition. On a weight basis, the amount of amine curing agent will be from about 5 to about 50 parts of the amine compound to 100 parts of the modified epoxide resin. The preferred amounts will vary, of course, with the particular amine being used, the epoxide resin, the alkylene carbonate and the end use of the cured product. Such variations can be readily determined by those skilled in the art.

The polycarboxylic acid and anhydride curing agents can be saturated or unsaturated, aliphatic, cycloaliphatic, aromatic or heterocyclic. Examples of these acids and anhydrides include phthalic anhydride, tetrahydrophthalic anhydride, hexahydrophthalic anhydride, hexachloroendomethylenetetrahydrophthalic anhydride, maleic anhydride, succinic anhydride, dodecylsuccinic acid anhydride, pyromellitic dianhydride, polyadipic acid anhydride, adipic acid, azelaic acid and dimerized and trimerized unsaturated fatty acids. The amount of acid or anhydride that is used to cured the modified polyepoxide resins ranges from about 0.5 to 1.5 acid or anhydride groups per each epoxide and carbonate group in the modified resin. The preferred amounts will vary with the compounds being used and the desired end use and are deemed to be readily determinable by those skilled in the art.

The alkylene carbonates may be combined with polyepoxide resins and other ingredients in any convenient manner. For instance all the ingredients can be simply mixed together prior to curing. The preferred method, however, is to prepare the compositions by first blending the alkylene carbonate with the epoxide resin and then incorporating the curing agent into the mixture. The blending operation can be conducted at room temperature, or can be carried out by heating the components.

If desired, other ingredients can be added to the novel compositions before they are cured. Such ingredients include fillers, pigments, dyes, plasticizers and the like in the amounts ordinarily employed for such purposes. Combinations of the compositions of this invention with other resins, such as alkyd resins, urea resins, melamine resins and phenolic resins, can be readily cured to form useful products.

The alkylene carbonate-epoxide resin compositions of this invention in combination with epoxide resin curing agents can be cured at room temperature or by heating them at a suitable temperature. The curing temperatures can be varied between room temperature and up to 200° C. or higher. The desirable curing temperature will depend, of course, upon the compositions being used, such temperatures being readily determined by those skilled in the art.

The invention is illustrated by the following examples. "Parts," where used, is intended to means parts by weight. The epoxide resins used in the examples are identified as follows:

Epoxide A is the reaction product of bisphenol A (p,p'dihydroxydiphenyl propane) and epichlorohydrin reacted in a molar ratio of 1 to 10 in an alkaline medium, the resin having an epoxide equivalent weight of 190 and a Gardner-Holdt viscosity at 25° C. of $Z_5$ to $Z_6$.

Epoxide B is the reaction product of 1 mol of bisphenol A and 2.6 mols of epichlorohydrin with sodium hydroxide, the resin having an epoxide equivalent weight of 250 and a melting point of 24° C.

Epoxide C is the reaction product of 1 mol of bisphenol A and 1.57 mols of epichlorohydrin with sodium hydroxide, the resin having an epoxide equivalent weight of 480 and a melting point of 70° C.

Epoxide D is the reaction product of 1 mol of bisphenol A and 1.22 mols of epichlorohydrin with sodium hydroxide, the resin having an epoxide equivalent weight of 940 and a melting point of 100° C.

*Example 1*

To a suitable container were added 80 parts of Epoxide A and 20 parts of propylene carbonate. These components were mixed by stirring until a clear homogeneous solution was obtained. The resulting solution had a Gardner-Holdt viscosity at 25° C. of N to O. Epoxide A has a Gardner-Holdt viscosity at 25° C. of $Z_5$ to $Z_6$.

*Example 2*

To further demonstrate the reduction is viscosity that occurs when epoxide resins are blended with alkylene carbonates, a series of mixtures was prepared. The components were blended as described in Example 1, except heat was used to aid in dissolving the solid epoxide resins in the alkylene carbonate. The viscosities (Gardner-Holdt at 25° C.) of the mixtures are given in Table I.

TABLE I

| Epoxide Resin | Parts | Alkylene Carbonate | Parts | Viscosity |
|---|---|---|---|---|
| Epoxide A | 90 | Ethylene Carbonate | 10 | Y to Z. |
| Do | 80 | ____do____ | 20 | P to Q. |
| Do | 70 | ____do____ | 30 | F to G. |
| Do | 90 | Propylene Carbonate | 10 | X to Y. |
| Do | 70 | ____do____ | 30 | E to F. |
| Epoxide B | 80 | ____do____ | 20 | $Z_5$ to $Z_5^1$. |
| Do | 60 | ____do____ | 40 | G to H. |
| Epoxide C | 60 | ____do____ | 40 | $Z_6$. |
| Epoxide D | 60 | ____do____ | 40 | $Z_6+$. |

Example 3

To a blend of 160 parts of Epoxide A and 40 parts of propylene carbonate were added with stirring 30 parts of diethylene triamine. When a clear solution was obtained, the composition was poured into a mold and left overnight at room temperature. The resulting cured composition was then heated for 2 hours at 100° C. The properties of the resulting casting were as follows:

| | |
|---|---|
| Tensile, p.s.i. | 11,577 |
| Flexure, p.s.i. | 20,856 |
| Impact (Izod), ft. lb./in. notch | 0.474 |
| Water absorption, percent | 0.77 |
| Hardness (Shore D) | 94 |

Example 4

Using the same procedure as described in Example 3, additional epoxide resin-alkylene carbonate compositions were cured with amines. The components used to prepare the cured compositions are listed in Table II. The polyamido-amino curing agent used is the reaction product of tall oil fatty acids and an excess of tetraethylene pentamine having a viscosity of 150–400 cps. at 25° C., and an amine hydrogen equivalent weight of 90. The physical properties of the cured compositions are listed in Table III.

TABLE II

| Composition | Epoxide Resin | Alkylene Carbonate | Curing Agent |
|---|---|---|---|
| A | Epoxide A, 160 parts. | Propylene Carbonate, 40 parts. | Diethylene Triamine, 25.4 parts. |
| B | do | do | Diethylene Triamine, 20.4 parts. |
| C | do | do | Diethylene Triamine, 30.4 parts. |
| D | do | do | Polyamido Amine, 100 parts. |
| E | do | Ethylene Carbonate, 40 parts. | Do. |
| F | do | do | Diethylene Triamine, 30 parts. |
| G | Epoxide B, 160 parts. | Propylene Carbonate, 40 parts. | Polyamido Amine, 100 parts. |

TABLE III

| Composition | Tensile, p.s.i. | Flexure, p.s.i. | Impact (Izod ft.lb./in. notch) | Water Absorption | Hardness Shore D |
|---|---|---|---|---|---|
| A | 8,937 | 16,870 | 0.483 | 0.58 | 89 |
| B | 8,960 | 14,496 | 0.452 | 0.53 | 88 |
| C | 10,550 | 20,314 | 0.514 | 0.65 | 91 |
| D | 2,723 | | 0.737 | 0.68 | 68 |
| E | 3,826 | | 1.805 | 1.20 | 72 |
| F | | 21,680 | 0.484 | 1.82 | 90 |
| G | 1,273 | | 1.002 | 1.18 | 86 |

Example 5

In a suitable container 160 parts of Epoxide A and 40 parts of propylene carbonate were blended with stirring. To this blend were added 24 parts of metaphenylene diamine. After heating to 75° C. to dissolve the metaphenylene diamine in the epoxide resin-propylene carbonate blend, the components were poured into a mold and were heated at 93° C. for two hours and at 204° C. for two hours. The properties of the well cured casting were:

| | |
|---|---|
| Tensile, p.s.i. | 8126 |
| Flexure, p.s.i. | 14,830 |
| Impact (Izod), ft. lb./in. notch | 0.860 |
| Water absorption, percent | 0.53 |
| Hardness (Shore D) | 89 |

Example 6

In a suitable container, 4.5 parts of boron trifluoride-triethyl amine complex were dissolved in 30 parts of propylene carbonate. This solution was then blended with 120 parts of Epoxide A and the blend was poured into a mold. After heating at 150° C. for 4 hours, the resulting well-cured casting had the following properties:

| | |
|---|---|
| Tensile, p.s.i. | 5390 |
| Impact (Izod), ft. lb./in. notch | 0.435 |
| Water absorption, percent | 0.47 |
| Hardness (Shore D) | 84 |

Example 7

In a suitable container, 160 parts of Epoxide A and 40 parts of propylene carbonate were codissolved. To this solution were added 164 parts of hexahydrophthalic anhydride and 3.6 parts dimethylaminomethyl-phenol. The resulting solution was poured into a mold and was heated at 93° C. for two hours and at 204° C. for two hours. The resulting well-cured casting had the following properties:

| | |
|---|---|
| Tensile, p.s.i. | 10,444 |
| Impact (Izod), ft. lb./in. notch | 0.403 |
| Water absorption, percent | 0.15 |
| Hardness (Shore D) | 92 |

Example 8

To a solution of 8 parts of Epoxide A and 2 parts of propylene carbonate were added 1.2 parts of tetraethylene pentamine. Films were drawn down on tin plate with a 3 mil doctor blade. After a 10-minute bake at 100° C., the films were well-cured and exhibited no film failure or loss of adhesion after one hour immersion in boiling water.

It is to be understood that the foregoing detailed description is given merely by way of illustration and that many variations may be made therein without departing from the spirit of my invention.

The embodiments of the invention in which an exclusive property or privilege is claimed are defined as follows:

1. A composition comprising a polyepoxide resin having a 1,2 epoxy equivalency greater than 1 and from 1 to 80 parts by weight per 100 parts by weight of said polyepoxide of an alkylene 1,2 carbonate having 2 to 10 carbon atoms in its alkylene group.

2. A composition comprising a polyepoxide resin having a 1,2 epoxy equivalency greater than one and from 1 to 80 parts by weight per 100 parts by weight of said polyepoxide of an alkylene 1,2 carbonate selected from at least one member of the group consisting of ethylene carbonate and propylene carbonate.

3. The composition of claim 2 wherein the polyepoxide resin is a glycidyl polyether of p,p'-dihydroxydiphenyl propane.

4. A curable composition comprising a polyepoxide resin having a 1,2 epoxy equivalency greater than 1, from 1 to 80 parts by weight per 100 parts by weight of said polyepoxide of an alkylene 1,2 carbonate having 2 to 10 carbon atoms in its alkylene group and an epoxide resin curing agent.

5. A curable composition comprising a polyepoxide resin having a 1,2 epoxy equivalency greater than 1, from 1 to 80 parts by weight per 100 parts by weight of said polyepoxide of an alkylene 1,2 carbonate selected from at least one member of the group consisting of ethylene carbonate and propylene carbonate and an epoxide resin curing agent.

6. The composition of claim 5 wherein the polyepoxide resin is a glycidyl polyether of p,p'-dihydroxydiphenyl propane.

7. The composition of claim 5 wherein the epoxide resin curing agent is an aliphatic polyamine.

8. A composition prepared by mixing a polyepoxide resin having a 1,2 epoxy equivalency greater than 1, from 1 to 80 parts by weight per 100 parts by weight of said polyepoxide resin of an alkylene 1,2 carbonate having 2 to 10 atoms in its alkylene group and an epoxide resin curing agent, and curing the resulting mixture.

9. A composition prepared by mixing a polyepoxide resin having a 1,2 epoxy equivalency greater than 1, from 1 to 80 parts by weight per 100 parts by weight of said polyepoxide resin of an alkylene 1,2 carbonate selected from at least one member of the group consisting of ethylene and propylene carbonate and an epoxide resin curing agent, and curing the resulting mixture.

10. The composition of claim 9 wherein the polyepoxide resin is a glycidyl polyether of p,p'-dihydroxydiphenyl propane, the alkylene 1,2 carbonate is propylene carbonate and the epoxy resin curing agent is an aliphatic polyamine.

11. A process for preparing a cured composition which comprises mixing a polyepoxide resin having a 1,2 epoxy equivalency greater than 1, from 1 to 80 parts by weight per 100 parts by weight of said polyepoxide resin of an alkylene 1,2 carbonate having 2 to 10 carbon atoms in its alkylene group and an epoxide resin curing agent, and curing the resulting mixture.

No references cited.

WILLIAM H. SHORT, *Primary Examiner.*

T. D. KERWIN, *Assistant Examiner.*